(12) United States Patent
Downs et al.

(10) Patent No.: US 9,783,433 B2
(45) Date of Patent: Oct. 10, 2017

(54) WATER TREATMENT VALVE CONTROL SYSTEM WITH ROTARY POSITION SENSOR

(71) Applicant: Aquion, Inc., Elk Grove Village, IL (US)

(72) Inventors: James J. Downs, Bloomingdale, IL (US); Andrew J. Kajpust, Hanover Park, IL (US); Daryl D. Sielaff, Louisville, KY (US)

(73) Assignee: Aquion, Inc., Roselle, IL (US)

( * ) Notice: Subject to any disclaimer, the term of this patent is extended or adjusted under 35 U.S.C. 154(b) by 638 days.

(21) Appl. No.: 14/323,284

(22) Filed: Jul. 3, 2014

(65) Prior Publication Data
US 2016/0002064 A1    Jan. 7, 2016

(51) Int. Cl.
*F16K 37/00* (2006.01)
*C02F 1/42* (2006.01)
*B01J 49/80* (2017.01)

(52) U.S. Cl.
CPC ............... *C02F 1/42* (2013.01); *B01J 49/80* (2017.01); *C02F 2209/445* (2013.01); *C02F 2303/16* (2013.01)

(58) Field of Classification Search
CPC ... F16K 37/00; F16K 37/0041; C02F 2303/16
USPC .................................. 137/556; 210/91, 191
See application file for complete search history.

(56) References Cited

U.S. PATENT DOCUMENTS

| 4,621,250 | A | 11/1986 | Echasseriau et al. |
|---|---|---|---|
| 5,098,063 | A | 3/1992 | Ronzon |
| 8,356,628 | B2 | 1/2013 | Quinn et al. |
| 2003/0000765 | A1 | 1/2003 | Spadafora |
| 2007/0262029 | A1 | 11/2007 | Yoshida et al. |
| 2012/0312756 | A1* | 12/2012 | Chandler, Jr. ............ C02F 1/42 210/754 |

OTHER PUBLICATIONS

2016 Mar. 2016—(WO) International Search Report—App PCT/US2015/039042.
Panasonic RPS Specification, Position Sensors/EVWAE/D, 10 mm GS Sensors, Oct. 2012, 2 pages.
Pentair ProFloSE Upflow Brining Service Manual, May 2005, 33 pages.

* cited by examiner

*Primary Examiner* — Marina Tietjen
*Assistant Examiner* — Paul J Gray
(74) *Attorney, Agent, or Firm* — Banner & Witcoff, Ltd.

(57) ABSTRACT

Water treatment and valve control systems and apparatuses, and methods of using the same, are disclosed. In some examples, the apparatuses, systems, and methods include use of a rotary position sensor and one or more rotatable elements configured to, when moving from an initial rotational position to subsequent rotational positions, move one or more element of a valve assembly. In various examples of the apparatuses, systems, and methods, the rotatable element rotates directly from one rotational position to another rotational position. In certain examples, the rotary position sensor measures an electrical resistance value to detect the rotational position of the rotatable element.

18 Claims, 8 Drawing Sheets

WATER TREATMENT VALVE CONTROL SYSTEM WITH ROTARY POSITION SENSOR

TECHNICAL FIELD

Certain aspects of the disclosure relate to water treatment systems such as water softener systems, valve control systems, apparatuses, and methods. In particular, certain aspects of the disclosure relate to water treatment systems, water softener systems, valve control systems, apparatuses, and methods involving use of a rotary position sensor and one or more rotatable elements.

BACKGROUND

Water softening systems are used to remove minerals such as calcium and magnesium ions from "hard" groundwater that has dissolved these minerals from the earth. These systems often utilize a resin tank containing a resin material, such as polystyrene beads, that is initially ionically bonded to sodium ions. When the hard water flows through the resin material, the "hard" calcium and magnesium ions replace the sodium and ionically bond to the resin material due to their relatively stronger ionic charge. These systems require the periodic replenishing of sodium ions, typically though the use of a regeneration cycle where a brine solution having a high concentration of sodium salt is used to replace the calcium and magnesium ions on the resin material, thus allowing the resin material to again soften additional hard water. These water softening systems require systems to allow various types of water flow, for example a "service" flow where hard water from a ground water source is routed through the resin tank and then the softened water is routed into the household or building internal plumbing system. The systems may also utilize a flow to allow the creation of brine by filling a brine tank with a controlled amount of water, a flow to draw the brine solution into the resin tank, a flow to slowly drive the brine through the resin bed in the resin tank, a flow or flows to flush any remaining brine solution out of the resin tank at the end of the regeneration cycle, a reverse flow through the resin bed to remove any debris or sediment, and the like.

Water softening systems generally stay in the "service" flow position as this is the most commonly used operation mode of the system, and only change to the other flow positions when needed. Thus, a number of systems have been developed to control the flow of water by moving the components of the system and determining when the system is in the "home" or service orientation, and when the components of the system have been configured to be in another flow position.

In some water softening systems, two slots and switches are used to control the flow of water in the system. For example, in some systems a rotating cam simultaneously engages two mechanical switches. One of the switches solely indicates whether the system is "home" or "not home," where "home" means the system is in the "service" flow position. A second switch indicates that the system is or is not in a regeneration position. In such systems, however, one regeneration position cannot be distinguished from any other except counting from the home switch down every other switch operation and then determining what each particular switch operation indicates. Therefore, after any memory loss event, the system must recalibrate to "home," and thus requires inefficient movement of the cam, regardless of its relative position.

Other systems utilize a rotating cam with a series of cylindrical features, each of which engages a mechanical switch. Each cylindrical feature has high and low portions on its circumference, causing the switch to be either "closed" or "open." The combination of switch open/closed signals provides a digital code for each position. These positions, however, are not very accurate as the initial moment any switch moves the system determines it has changed state and is in the subsequent position, meaning the entire zone of possible motion until the next change of switch state has the same digital code. Thus, after any memory loss event these systems may not accurately reflect the actual position of the system components.

Other systems utilize rotary discs with a series of uniformly placed slots that rotate through an optical sensor that detects light passing through the rotating disc. One slot is larger than the rest to indicate the "home" position, and all other regeneration positions are identified by counting the number of slots detected after the home position. These systems, however, require recalibration every time the components need to change orientations by detecting the calibration reference, i.e. the "home" slot, because the "home" position cannot be determined with certainty except by movement of the disc. Thus, each regeneration cycle has to start by moving the disc back to the starting position to confirm it to be the "home" position. Only then can the system rotate the disc and subsequently detect and count all the subsequent slots to determine the position of the disc, and when it has rotated to a desired position. This requires inefficient rotation and adds time to the procedure since the system must check for home before initiating the procedure. Moreover, the speed of the rotation in these systems may vary, particularly when the system uses a DC motor, as is typical, and the system therefore may not properly detect or interpret all the slots, as the slot width is determined by the time it takes to traverse the optical sensor. For example, if the speed is too fast the system may not detect a slot, or if it is too slow may misinterpret another slot as the "home" position.

To alleviate these possible inefficiencies, it may be desirable to provide systems, apparatuses, and methods that overcome one or more of the aforementioned drawbacks.

SUMMARY

This Summary provides an introduction to some general concepts relating to this disclosure in a simplified form that are further described below in the Detailed Description. This Summary is not intended to identify key features or essential features of the disclosure.

In accordance with one exemplary aspect, a water treatment system is provided. In some examples, the water treatment system is a water softener system. In some examples, the water treatment system includes a first rotatable element operably connected to a first moveable element of a valve assembly and configured to move from an initial rotational position to at least two subsequent rotational positions, and further configured to move the first moveable element between an initial position corresponding to the initial rotational position of the rotatable element, and at least two subsequent positions corresponding to the at least two subsequent rotational positions of the first rotatable element. In certain examples the system includes a rotary position sensor operably connected to the first rotatable element and configured to detect the rotational position of the first rotatable element. In various embodiments, the valve assembly is configured to be independently connected to a brine tank, a resin tank, a water supply, a drain, a plumbing system, or a combination thereof. Similarly, in various embodiments, the valve assembly may be configured to be independently connected to at least two of: a brine tank, a resin tank, a water supply, a drain, and a plumbing system. In some embodiments, the system is configured to move the first rotatable element directly from one subsequent rotational position to another subsequent rotational position. In other words, the first rotatable element may be moved from one subsequent rotational position to another subsequent rotational position without rotating a full revolution (i.e., 360 degrees) or more. In certain examples, the rotary position sensor is configured to detect the rotational position of the first rotatable element during use of the system without recalibrating to a reference position.

In various embodiments, the system includes a motor configured to rotate the first rotatable element, at least one computer processor, and at least one non-transitory computer-readable medium having stored therein computer executable instructions. In some examples, when the instruction are executed by the processor, it causes the water treatment system to rotate the first rotatable element from the initial rotational position to one of the subsequent rotational positions, and the rotary position sensor determines when the first rotatable element is in one of the subsequent rotational positions.

In certain examples, the rotary position sensor comprises a resistive material having an electrical resistance when an electric current is applied, and the resistive material comprises a first end and a second end. In various embodiments the first rotatable element includes a contact wiper, or is integrally or operably connected to a contact wiper. The contact wiper may be configured to rotate with the first rotatable element and, in at least some of its rotational positions, contact the resistive material between the first end and the second end. In certain embodiments, the rotary position sensor is configured to apply an electric current to the resistive material and measure the electrical resistance of a portion of the resistive material between an end of the resistive material and the contact wiper to detect the rotational position of the first rotatable element.

In some embodiments, the system includes a second rotatable element operably connected to the first rotatable element, and a second moveable element of the valve assembly operably connected to the second rotatable element, where the second moveable element is configured to open or close a brine tank valve of the valve assembly. In various examples, computer executable instructions stored in computer memory of the water treatment system, when executed by a processor of the water treatment system, further cause the water treatment system to rotate the first rotatable element from the initial rotational position to at least one brine flow rotational position, wherein brine tank valve is open when the first rotatable element is in the at least one brine flow position. In certain examples, the instruction further cause the system to rotate the first rotatable element from the initial rotational position to at least four subsequent rotational positions, where the rotary position sensor determines when the first rotatable element is in each of the at least four subsequent rotational positions, and where the first moveable element of the valve assembly is configured to move to at least four subsequent positions corresponding at least four subsequent rotational positions of the first rotatable element.

In various examples, a range of measured electrical resistance values is used to detect whether the first rotatable element is the initial rotational position or the at least two subsequent rotational positions, or the at least four subsequent rotational positions. In certain embodiments, the contact wiper and the resistive material are configured such that the contact wiper is not in contact with the resistive material in at least some of its rotational positions.

In accordance with another exemplary aspect, a valve control system is provided. In some examples, the valve control system includes a first rotatable element configured to be operably connected to a first moveable element of a valve assembly and configured to move from an initial rotational position to at least one subsequent rotational position. In certain embodiments the system includes a rotary position sensor operably connected to the first rotatable element, where the rotary position sensor is configured to detect the rotational position of the first rotatable element. In various examples of the valve control system, the rotary position sensor comprises a resistive material having an electrical resistance when an electric current is applied, and the resistive material comprises a first end and a second end. In certain examples, the first rotatable element comprises a contact wiper, or is integrally or operably connected to a contact wiper, and the contact wiper is configured to rotate with the first rotatable element and, in at least some of its rotational positions, contact the resistive material between the first end and the second end. In various embodiments, the rotary position sensor is configured to apply an electric current to the resistive material and measure the electrical resistance of a portion of the resistive material between an end of the resistive material and the contact wiper to detect the rotational position of the first rotatable element.

In certain examples, the valve control system further includes a motor configured to rotate the first rotatable element, at least one computer processor, and at least one non-transitory computer-readable medium having stored thereon computer executable instructions. In certain embodiments, when the instructions are executed by the at least one processor, they cause the valve control system to rotate the first rotatable element from the initial rotational position to the at least one subsequent rotational position, where the rotary position sensor determines when the first rotatable element is in the at least one subsequent rotational position. In various examples, the instructions further cause the valve control system to rotate the first rotatable element from the initial rotational position to at least two subsequent rotational positions, where the rotary position sensor determines when the first rotatable element is in each of the at least two subsequent rotational position. In some example of the valve control system, the system is configured to rotate the first rotatable element directly from one subsequent rotational position to another subsequent rotational position.

In accordance with yet another exemplary aspect, methods are provided. In some examples, the method includes rotating a first rotatable element operably connected to a first moveable element of a valve assembly from an initial rotational position to at least four subsequent rotational positions, and moving, via the rotation of the rotatable elements and the operable connection to the moveable element, the first moveable element from an initial position, corresponding to the initial rotational position of the first rotatable element, to at least four subsequent positions corresponding to the at least four subsequent rotational positions of the first rotatable element. In some examples the method includes detecting the rotational position of the first rotatable element through a rotary position sensor operably connected to the first rotatable element. In various embodiments, the first rotatable element rotates directly from one subsequent rotational position to another subsequent rotational position.

In some examples, a motor rotates the first rotatable element, and at least one computer processor executes computer executable instructions stored on at least one non-transitory computer-readable medium to cause the motor to rotate the first rotatable element from the initial rotational position to one of the subsequent rotational positions, and to further cause the rotary position sensor to determine when the first rotatable element is in one of the subsequent rotational positions.

BRIEF DESCRIPTION OF THE DRAWINGS

Exemplary embodiments of the disclosure will now be described by way of example only and with reference to the accompanying drawings, in which.

DETAILED DESCRIPTION OF EMBODIMENTS

The embodiments, apparatuses and methods described herein provide, inter alia, systems, components, and methods related to water treatment, water softening and/or valve control systems and methods. These and other aspects, features and advantages will be further understood by those skilled in the art from the following description of exemplary embodiments. It is to be further understood that the systems, apparatuses and methods are capable of other embodiments and of being practiced and carried out in various ways.

In the following description of various examples of systems and methods of the this disclosure, reference is made to the accompanying drawings, which form a part hereof, and in which are shown by way of illustration various example structures and environments in which aspects of the disclosure may be practiced. It is to be understood that other structures and environments may be utilized and that structural and functional modifications may be made from the specifically described structures and methods without departing from the scope of the present disclosure. Moreover, the figures of this disclosure may represent the scale and/or dimensions according to one or more embodiments, and as such contribute to the teaching of such dimensional scaling. However, those skilled in the art will readily appreciate that the disclosure herein is not limited to the scales, dimensions, proportions, and/or orientations shown in the figures.

Figure 1:
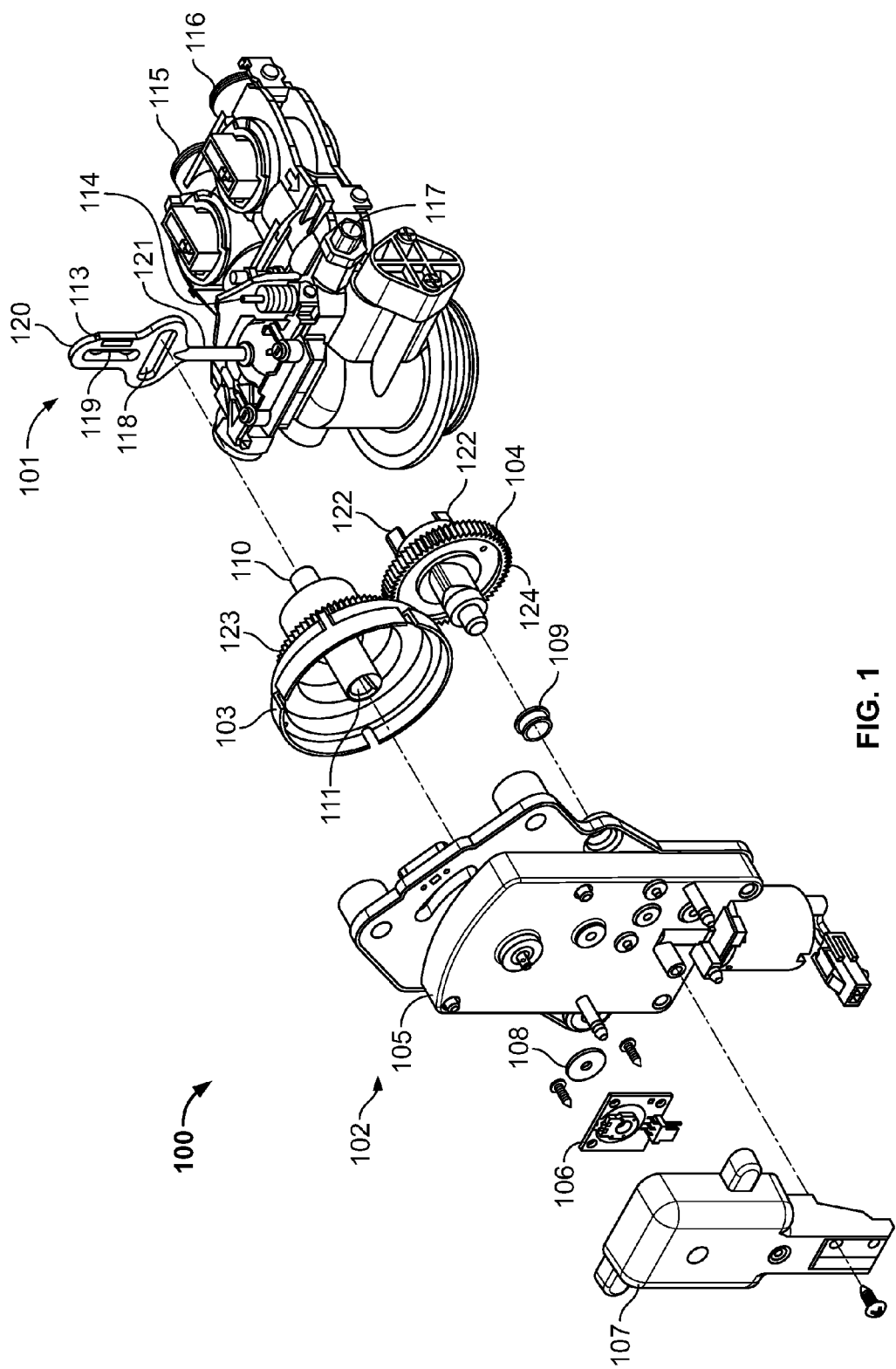
FIG. 1 illustrates an exploded perspective view of components of an exemplary embodiment of a water softening system.

Some exemplary aspects relate to water treatment systems. In certain examples, the water treatment systems are water softening systems, while in others they are water filtering systems. In some embodiments of water softening systems, the water softening system comprises a valve assembly, a valve control system, a brine tank, a resin tank, or a combination thereof. FIG. 1 shows an exemplary embodiment 100 of a water softening system including a valve assembly 101 and a valve control system 102. In this example, the valve control system comprises a first rotatable element 103, a second rotatable element 104, a gear motor 105, and a rotary position sensor 106, where the rotary position sensor 106 may also include a rotary position sensor housing 107 and a wiper disc 108, and the valve control system may also comprise a shaft bushing 109 for the second rotatable element 104. In the example of FIG. 1, the first rotatable element comprises a cam 110 and a shaft housing 111, and the system also comprises a sensor shaft 112 (not visible in this view), which may comprise or be integrally or operably connected to a contact wiper. In this example, the valve assembly 101 includes a first moveable element 113, a second moveable element 114, an outlet port 115, an inlet port 116, and additional system ports 117.

In this example, the valve assembly 101 is an assembly for use in a water softening system, while in other embodiments of the disclosure, the valve assembly may be used to control the flow of liquids and/or gases for other purposes. In some examples of the system, the first moveable element 113 is operably connected to the first rotatable element 103 of the valve control assembly. The operable connection may be direct, i.e. the rotatable element is in physical contact with the first moveable element, or indirect, i.e. via one or more connecting components.

In certain embodiments, the first moveable element is configured to move between an initial position corresponding to an initial rotational position of the first rotatable element, and one or more subsequent positions corresponding to one or more subsequent rotational positions of the first rotatable element. For example, in the embodiment shown in FIG. 1, the cam 110 of the first rotatable element fits in a cam cavity 118 of the first moveable element. As the cam rotates with the first rotatable element, the vertical translation of the cam is imparted to the first moveable element 113, moving it up and down relative to the main body of the valve assembly.

In this example embodiment, the first moveable element is a piston. In some embodiments, the first moveable element comprises or consists of a metal, a metal alloy, plastic, or a combination thereof. In certain embodiments, the element comprises one or more gaskets, for example one or more gaskets made from rubber, silicone, plastic, or a combination thereof. The first moveable element may have a variety of shapes and sizes depending on the characteristics and purposes of the valve assembly. In this exemplary embodiment, the element comprises an upper portion 119 comprising a cam cavity 118 and a second cavity 120, and an intermediate portion 121 connected to the lower piston portion controlling flow within the valve assembly. In certain examples, the intermediate portion may comprise the piston portion. In various embodiments, the piston is essentially cylindrical and has one or more flow passages or cavities, while in others it has one or more concave areas, one or more indentations, or a generally undulating shape to allow flow of materials around a portion or portions of the piston.

In this example, and as described in more detail below, the various positions of one or more pistons allow and/or block certain flow channels within the valve assembly as needed by the water treatment system or other systems. For example, one position of the first movable element or piston may allow incoming ground water to flow into the resin tank to be treated by the resin in the tank, and then routed out into an internal plumbing system of a building or household. As another example, another position of the first moveable element or piston may allow water to flow into a brine tank of the water softening system to create brine by mixing with salt stored in the brine tank. As yet another example, another position of the first moveable element or piston may allow, after the regeneration of the resin material with brine, to drain the brine solution and the hard ions out of the resin tank.

In some examples, the valve assembly includes a second moveable element, such as the second moveable element 114 shown in FIG. 1. In certain embodiments, the second moveable element is operably connected to the second rotatable element such that as second rotatable element rotates, the second moveable element of the valve assembly moves between two or more positions. The operable connection of these elements, or any other elements described herein as "operably connected" or with similar language, may be direct or indirect. For example, in the example of FIG. 1, the second rotatable element 104 comprises a pair of projections 122 that, in some rotational orientations, press down on the second moveable element, causing it to move vertically downward into a downward position. In this example, the second moveable element acts as a brine tank valve of the valve assembly that may open and close to allow the flow of water into the brine tank, or the flow of brine out of the brine tank, as it moves up and down (a "brine flow" position refers to the orientation of the second moveable element that allows the flow of liquid into or out of the brine tank through the valve assembly). Thus, in some embodiments the second moveable element is configured to open or close a brine tank valve of the valve assembly.

In certain examples, the valve assembly includes one or more ports. In this exemplary embodiment, the assembly includes an outlet port 115, and an inlet port 116, and one or more additional system ports 117. In some examples, the inlet port is configured to receive hard water from a ground water source, such as a water main supply line, and the outlet port is configured to outflow treated, softened water into, for example, an internal building plumbing system, such as a household plumbing system. In this example, an additional system port 117 is configured to be connected to a brine tank. In certain examples, one or more additional service ports are configured to be connected to a resin tank, a drain, a water filter, or a combination thereof. In some embodiments, regardless of whether ports or some other connection features are used, the valve assembly is configured to be independently connected to a brine tank, a resin tank, a water supply, a drain, an internal plumbing system, a water filter, or a combination thereof. In certain examples, the service ports or other connections comprise a fastener. In some embodiments, the fastener is an internal thread, an external thread, a clamp, or a collar.

A variety of valve assemblies (e.g., a PENTAIR® 5000 assembly) may be used in embodiments of the systems, as would be apparent to a skilled artisan given the benefit of this disclosure.

Figure 3:
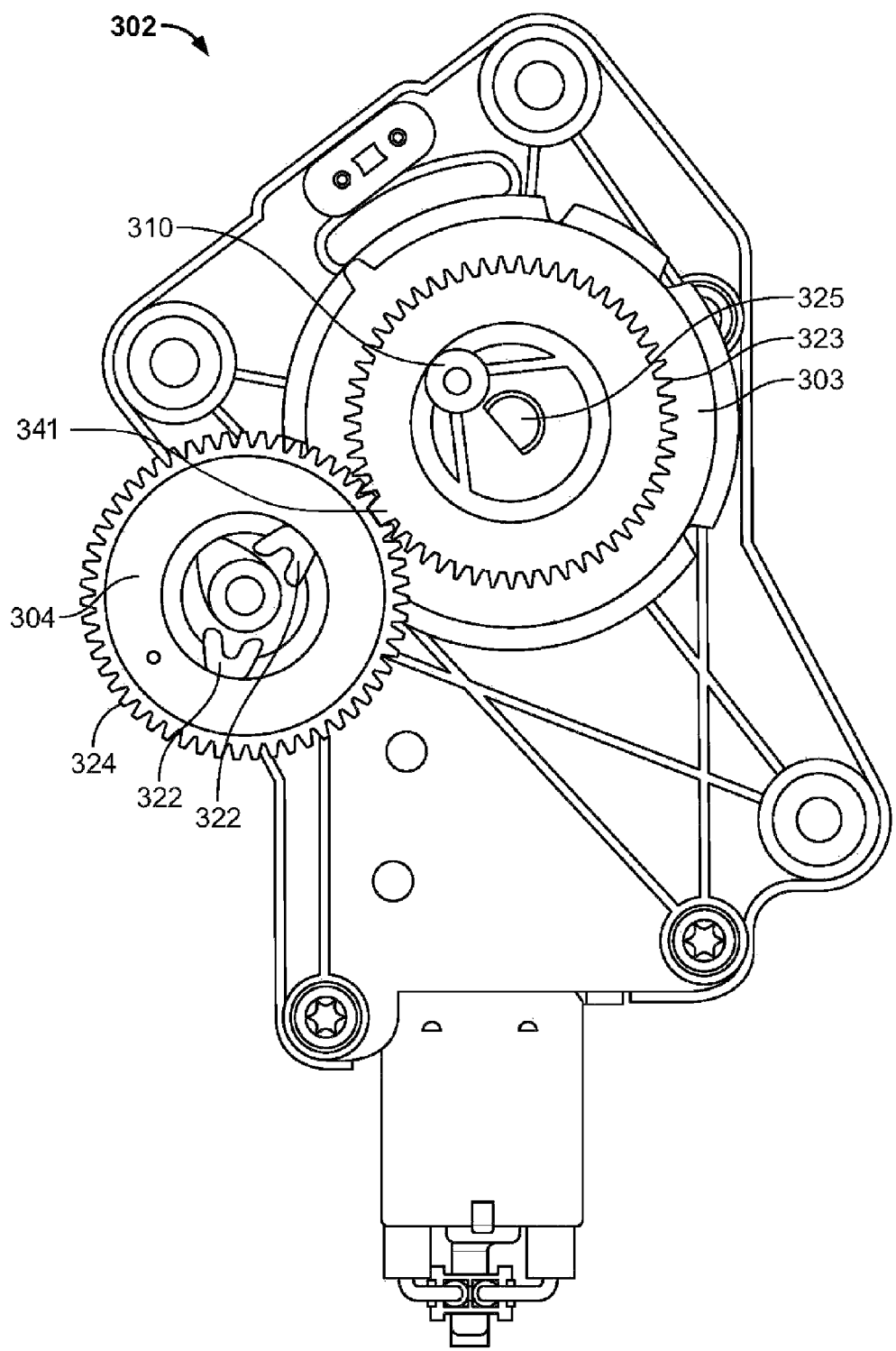
FIG. 3 illustrates a view of example rotatable elements and other components of an exemplary embodiment of a water softening system.

In the example of FIG. 1, the valve control system 102 is configured to control the movement and position of one or more valves in a water softening system, while in other embodiments the control system may be configured to control the flow of liquids and/or gases for other purposes. In this example, the first rotatable element is a circular element comprising gear teeth 123 around a portion of its circumference configured to interact with gear teeth 124 of the second rotatable element 104 such that the second rotatable element rotates when the first rotatable element is rotated. In certain examples, such as the example embodiment of FIG. 3, one or both of the rotatable elements comprise a structure or structures that assist in the proper alignment of the rotatable elements, such as a differently sized and/or shaped tooth, a key structure, corresponding shapes and/or projections, and the like. In the example of FIG. 3, the first rotatable element 303 comprises a key tooth 341, and the second rotatable element 304 comprises a corresponding gap in its gear teeth 324 sized and shaped to receive the tooth. In other examples, the first rotatable element comprises some other connection feature or component, such as a belt connected to the first rotatable element and the second rotatable element. In some examples, the first rotatable element is or comprises components that are circular, while in others it is or comprises components that are elliptical in shape, or are a geometric shape.

As discussed above, in certain embodiments the first rotatable element is operably connected to the first moveable element of the valve assembly, for example through the cam 110 of FIG. 1 or a similar structure. In other examples, the operable connection is through one or more arms or projections, or a combination of any of the above structures. In some examples, the operable connection comprises features or components that convert the rotary motion of the first rotatable element into linear motion of the first rotatable element. In certain embodiments, the operable connection is such that the full range of linear motion of the first moveable element corresponds to a full revolution of the first rotatable element, and thus the relative linear position may be correlated to the angular position of the first rotatable element. In various examples, the first rotatable element is configured to, via the operable connection, move from an initial rotational position to one or more subsequent rotational positions. In certain examples, the element is configured to move to two or more subsequent rotational positions, in certain examples, three or more, in still others four or more, and in yet others five or more.

In some examples the first rotatable element comprises a housing for a shaft or axle, such as a sensor shaft, or another material operably connected to a sensor shaft and/or a contact wiper. In the example of FIG. 1, the housing is a shaft housing 111 shaped and sized to contain a shaft comprising a sensor shaft, or a shaft operably connected to a sensor shaft.

Through an operable connection with the first moveable element, the first rotatable element may then move the moveable element between an initial position that corresponds to the initial rotational position of the rotatable element and one or more subsequent positions, each corresponding to one or more subsequent rotational positions of the first rotatable element.

In some examples, the valve control system comprises a second rotatable element, such as the element 104 of FIG. 1.

In some examples, the second rotatable element is operably connected to the first rotatable element via a connection feature or component, such as gear teeth 124 which interface with gear teeth 123 of the first rotatable element. In certain examples, the second rotatable element is also operably connected to the second moveable element of the valve assembly, such that is may move the second moveable element as discussed above. In some embodiments, the second rotatable element is only operably connected to the second moveable element in some rotational positions, or the manner of connection changes, for example another component or feature of the second rotatable element comes into contact with the second moveable element at certain rotational positions. For example, in the example of FIG. 1, the projections 122 come into contact with the second moveable element to push it down into the valve assembly in certain rotational positions for the second rotatable element.

In some examples, the valve control system comprises a motor, such as a gear motor 105 in the example of FIG. 1, which causes the first rotatable element to rotate when the motor is activated. In certain examples, the motor utilizes direct current, while in others it utilizes alternating current. In some examples, the motor is configured to allow the first rotatable element to rotate in both a clockwise and counter-clockwise direction. In some examples, the motor is configured to rotate in a single direction.

Figure 2:
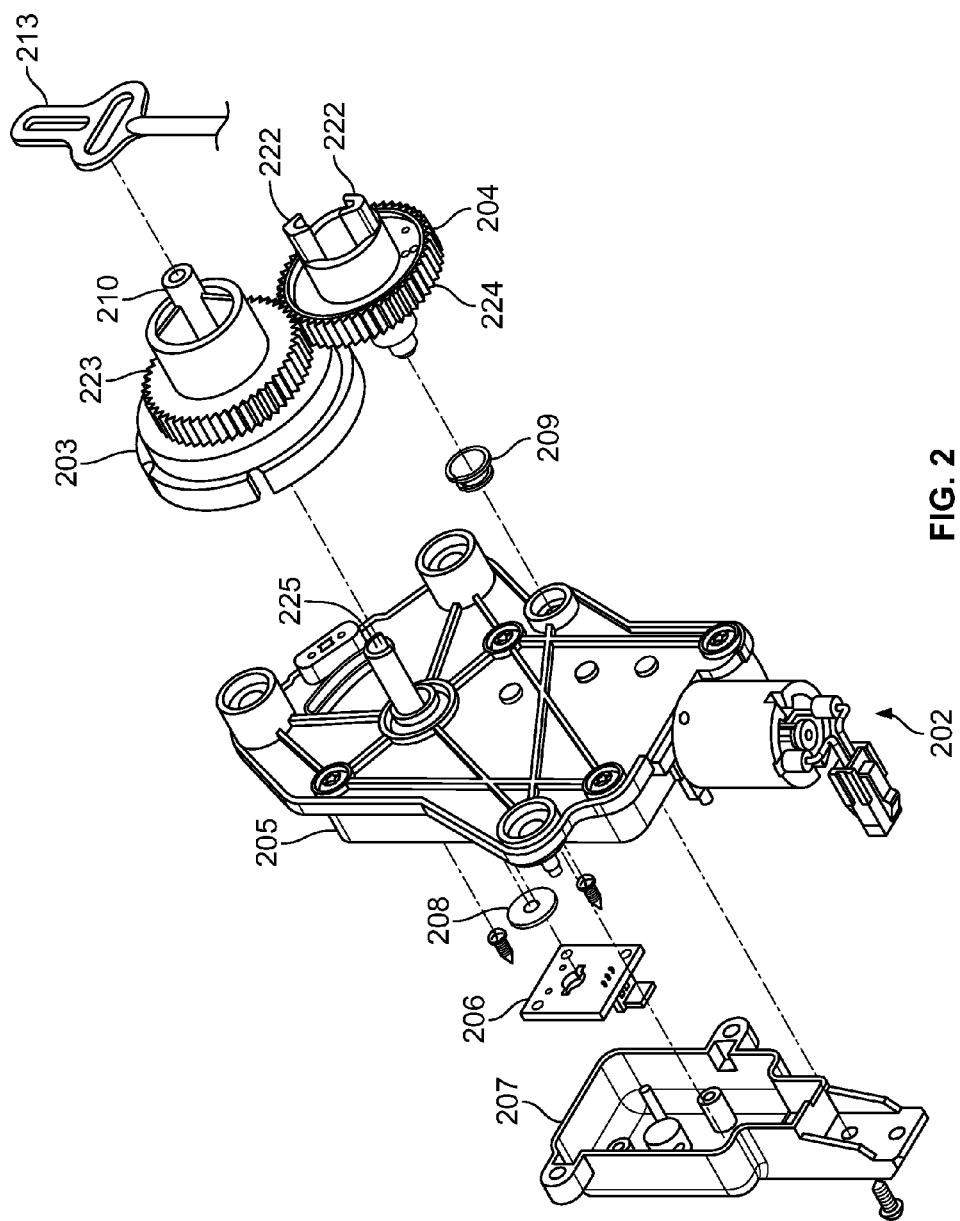
FIG. 2 illustrates an exploded perspective view of components of an exemplary embodiment of a water softening system.

In certain examples, the valve control system comprises a rotary position sensor, such as the sensor 106 of the embodiment in FIG. 1. In some examples, the rotary position sensor is operably connected to the first rotatable element. In various examples, the rotary position sensor is configured to detect the rotational position of the first rotatable element. The detection may be direct, i.e. the rotational position of the element itself or a component thereof is detected, while in others it is indirect, i.e. the rotational position of another component that rotates along with the first rotatable element is detected by the rotary position sensor. For example, FIG. 2 shows an exemplary embodiments of the valve control system comprising a shaft 225 that is housed within a shaft housing 211, (not visible in this view) of the first rotatable element 203 and rotates along with the first rotatable element (for ease in comparison of the illustrated embodiments in this and other Figures, the components in the shown embodiments that are similar to those in the previously shown embodiments have been given the same ten and one digit reference numerals as the components of other example embodiments, and given a hundred digit reference number corresponding to the number of the Figure—for example the first rotatable element is labelled 104 in the embodiment of FIG. 1, the analogous example element in FIG. 2 is labelled 204, the analogous example element in FIG. 3 is labelled 304, and so on).

In some embodiments, the component that is detected by the sensor is at least partially contained within the rotary position sensor, while in others it is in contact with at least a portion of the sensor. In still others it is indirectly connected to the sensor, and in yet others, where the sensor can detect one or more components not in physical contact with the sensor, such as sensors utilizing magnets, it is otherwise adjacent or nearby the sensor. In some examples, the sensor may measures a property where the property values may fall somewhere on a continuum based on the possible rotational positions of the element or component. For example, in some embodiments the sensor measures an electrical resistance, while in others it measures the strength of a magnetic field.

In some embodiments, the sensor detects the rotational position of a sensor shaft, such as sensor shaft 112, by measuring an electrical resistance. In certain examples, the rotary position sensor comprises a resistive material capable of conducting an electric current and having an electrical resistance when an electric current is applied, and the first rotatable element comprises a contact wiper, or is integrally or operably connected to a contact wiper. The contact wiper may be configured to rotate with the first rotatable element through an integral or operable connection. In some examples, the resistive material may have a shape corresponding to a portion of the circumference of a circle. The resistive material may be any material that has the appropriate electrical conduction and resistance properties, and may comprise or consist of a metal and/or transition metal, including, but not limited to, copper, aluminum, tin, steel, platinum, silver, iron, gold, brass, bronze, zinc, and/or nickel, or alloys thereof. In some examples, the material may comprise or consist of carbon particles, carbon fibers, carbon nanofibers, carbon nanotubes, and/or graphene. In certain embodiments, the material comprises a conductive polymer, such as polyaniline.

Figure 4:
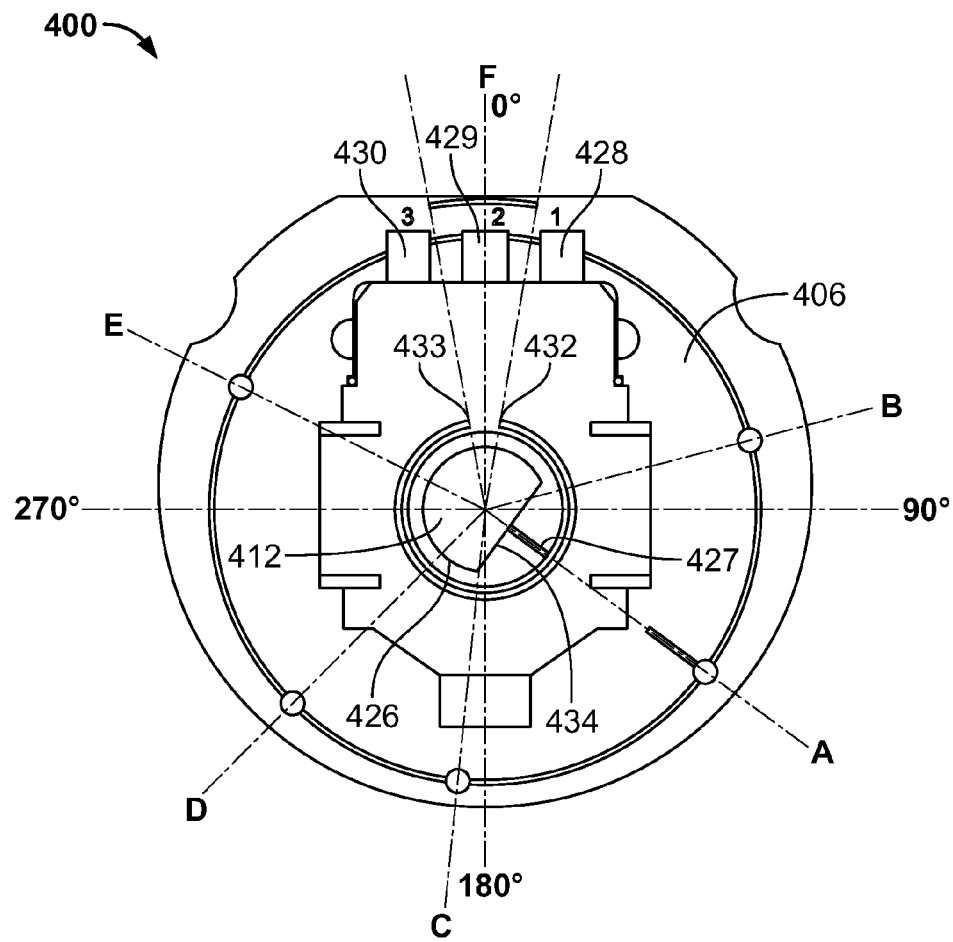
FIG. 4 illustrates a view an exemplary embodiment of a rotary position sensor and example rotational positions for use in a water softening system.

FIG. 4 shows an exemplary embodiment of a sensor 400 including a resistive material comprising a first end 432 and a second end 433. In this example, the first rotatable element is connected, via a sensor shaft 412, to a contact wiper 427. In some examples, the contact wiper is configured to rotate with the first rotatable element and, in at least some of its rotational positions, contact the resistive material between the first end and the second end. The rotary position sensor may be configured to apply an electric current to the resistive material and measure the electrical resistance of a portion of the resistive material between an end of the resistive material and the contact wiper to detect the rotational position of the first rotatable element. For example, the sensor may comprise electrical terminals connected to the first and second end of the resistive material and the contact wiper. In the example of FIG. 4, a first terminal 428 is connected to the first end of the resistive material, a second terminal 429 is connected to the contact wiper, and a third terminal 430 is connected to the second end 430. As the sensor shaft 412 rotates, the contact wiper 427 comes into contact with the resistive material, and therefore an electrical resistance between an end of the resistive material and the contact wiper may be measured. As the distance between them increases, requiring the current to travel through a larger portion of the resistive material, the relative value of the electrical resistance also increases. In examples where a constant voltage is supplied between the two ends of the resistive material, the wiper effectively acts as a voltage divider and the voltage at the position of the wiper is proportional to its relative angle to the ends of the resistive material.

Thus, in some examples, the rotary position sensor may be configured to, when the contact wiper is in at least some of its possible rotational positions, apply an electric current and measure the electrical resistance of a portion of the resistive material, where the size of the portion depends on the position of the wiper. The relative strength of the resistance may then be used to determine and detect the rotational position of the first rotatable element. In some examples, the sensor includes a "dead zone," for example the zone indicated by position F in FIG. 4, where no electrical resistance is measured because the contact wiper is not in contact with the resistive material when in any of the rotational positions in between the two ends of the resistive material. As the wiper rotates around the 360 possible degrees of rotation, it comes into contact with the resistive material, allowing a measured electrical resistance value, and the resistance increases as it moves along the material until the wiper again reaches the "dead zone" where the contact wiper is not in electrical contact.

In some examples, and as described in more detail below, a range of measured electrical resistance values is used to detect whether the first rotatable element is an initial rotational position or one or more subsequent rotational positions. For example, the range of electrical resistance that corresponds to the contact wiper being approximately 125-130 degrees from a reference point may be used to determine whether the contact wiper, and thus the first rotatable element, is in a particular position. In certain examples, the range, or "jog values" of electrical resistance correspond to approximately five degrees of rotation or less, approximately three degrees of rotation or less, approximately eight degrees of rotation or less, approximately ten degrees of rotation or less, or any other predetermined degree value or less. In some examples, the jog values provide a tolerance of plus or minus approximately 50 ohms from a resistance corresponding to a particular rotational position, in others a tolerance of plus or minus approximately 100 ohms, in others a tolerance of plus or minus approximately 250 ohms, in others a tolerance of plus or minus approximately 500 ohms, and in still others a tolerance of plus or minus a predetermined ohm value. In certain embodiments, the tolerance is approximately 1000 ohms or less, in others approximately 750 ohms or less, in others approximately 500 ohms or less, and in still others approximately 250 ohms or less.

Figure 5:
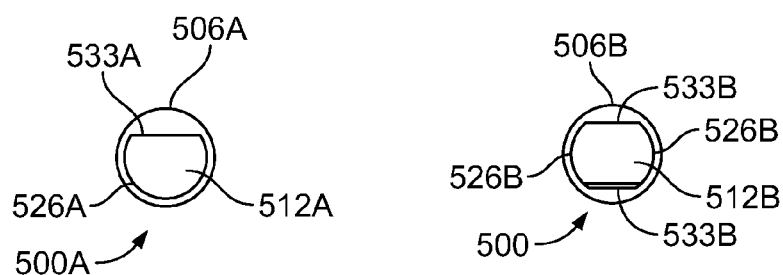
FIG. 5 illustrates example components for use with an example rotary position sensor.

The sensory shaft may have a variety of shapes allowing the selective contact of the contact wiper. In some embodiments, the sensor shaft or a portion thereof has a cylindrical shape, and in some examples the contact wiper may be on top of an exterior portion of the cylindrical surface. In certain embodiments the sensor shaft or a portion thereof has a generally cylindrical shape with an indentation or channel, or where a section of the cylinder is removed to provide a space for the contact wiper. For example, sensor shaft 412 comprises a generally circular perimeter shape 426 and a flat section 434 connected to the contact wiper 427. In some examples, the generally circular perimeter helps guide the rotation of the sensor shaft within the position sensor. FIG. 5 provides other exemplary embodiments of the sensor shaft 500A and 500B, where shaft 512A has a circular perimeter section 526A and a flat section 533A contained within a cavity of rotary position sensor 506A. Shaft 512B has two circular perimeter sections 526B and two flat sections 533B contained within a cavity of rotary position sensor 506B.

In some examples, the rotary position sensor is a Panasonic EVWAE/D sensor. In some embodiments, the total resistance range is approximately 0 to 5,000 ohms, while in others it is approximately 0 to 10,000 ohms, and yet still in others it is a range from a predetermined first ohm value to a second ohm value.

In some examples, the system may comprise at least one computer processor and at least one non-transitory computer-readable medium having stored therein computer executable instructions, that when executed by the at least one processor, cause the water softener system to perform various functions. Aspects of the steps described below may be executed using one or more computer processors. Such processors may execute computer-executable instructions stored on non-transitory computer-readable media. For example, the water softening system may comprise a computing device for controlling the overall operation of the system and its associated components. The device may include a computer processor, RAM, ROM, one or more input/output modules, and one or more non-transitory computer-readable media. Any suitable computer readable media may be utilized, including various types of tangible and/or non-transitory computer readable storage media such as, Flash memory/EEPROM, hard disks, and the like. The one or more media may store computer-readable instructions (e.g., software) and/or computer-readable data (i.e., information that may or may not be executable), which may provide instructions to the processor for enabling the system to perform various functions.

Figure 6:
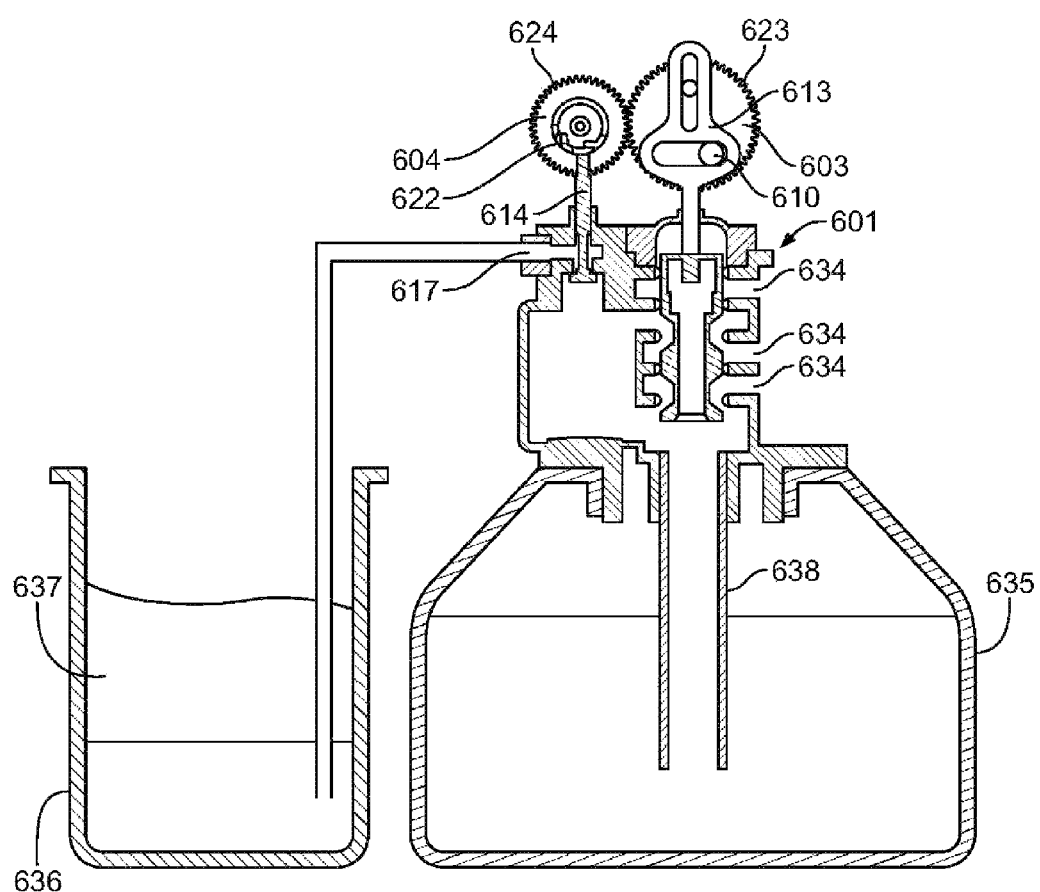
FIG. 6 illustrates a cross-sectional view of an embodiment of a water softening system, where in this example the rotatable elements and valve assembly are configured so that the water softening system is in a "service" mode.

In various examples, the computer executable instructions, when executed by the at least one processor, cause the water softener system to perform various functions. For example, the instructions may cause the system to rotate the first rotatable element from an initial rotational position to one or more the subsequent rotational positions, and cause the rotary position sensor to determine when the first rotatable element is in one of the subsequent rotational positions. For example, the first rotatable element may be in an initial position corresponding to a "service" mode of the valve assembly. In the example of FIG. 4, position A denotes this home or service position, and the contact wiper 427 is in position A relative to the dead zone, and thus the rotary position sensor measures a certain resistance value based on the position of the wiper. The measured resistance may correspond to a saved value or range of electrical resistance values stored on the readable media such that the computer processor may detect and verify that the first rotatable element is in the home or service position (as illustrated in FIG. 6 showing the valve assembly when the first rotatable element is a rotational position where the first moveable element is positioned to allow the service flow of water thought the valve assembly based on its position relative to plurality of channels 634). In some examples, when the instructions are executed, the first rotatable element is then rotated to one or more subsequent positions, as determined by the measured electrical resistance, which in turn may cause the first and/or second rotatable element to move to allow different flows though the valve assembly as described above.

Figure 7:
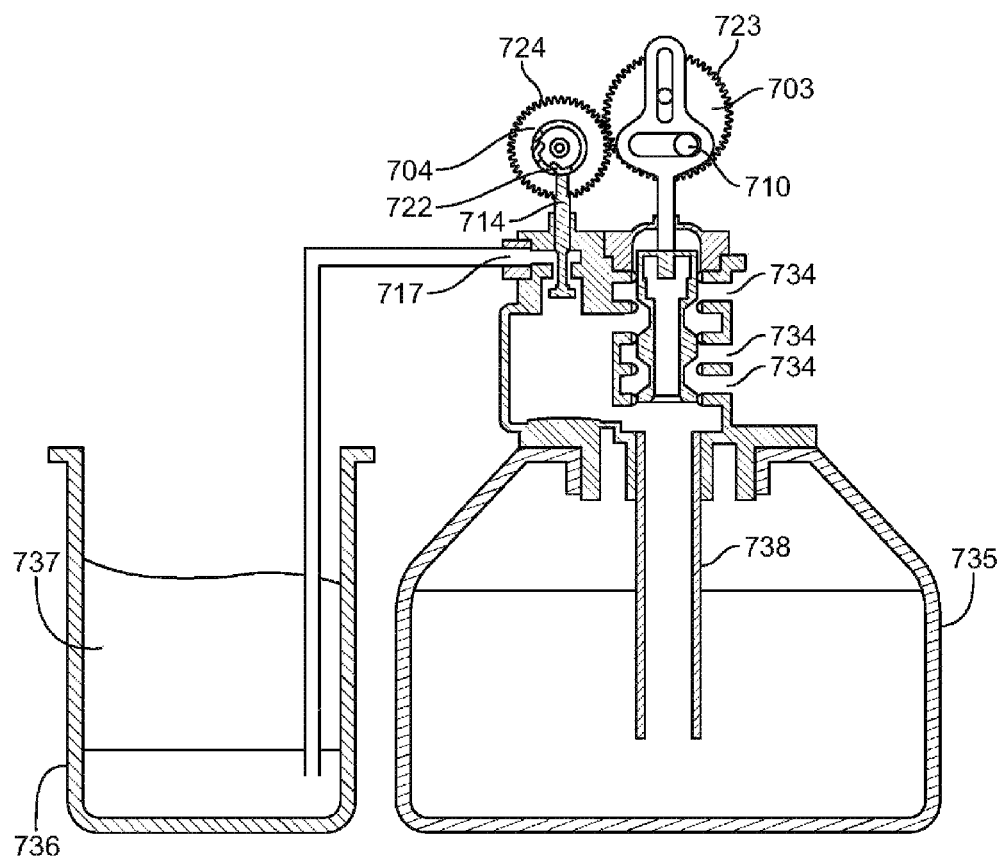
FIG. 7 illustrates a cross-sectional view of an embodiment of a water softening system, where in this example the rotatable elements and valve assembly are configured so that the water softening system is in a "brine flow" mode.

For example, when a user desires to regenerate the resin of the water softening system, or when the system automatically determines the resin should be regenerated (based on, e.g. the passage of time, by detecting how much water has been used since the last regeneration, or other criteria), the rotatable elements may move as needed to allow the various flows required for a regeneration cycle. As one representative example, FIG. 4 illustrates the possible positions of the first rotatable element for such a cycle. In this example, the instructions, when executed by the processor, cause the system to activate the gear motor and rotate the element in a counterclockwise direction from position A to position B, where the processor determines whether the element is in position B by monitoring the measured electrical resistance via the rotary position sensor. By this rotation, the second rotatable element is also rotated through the operable connection to the first rotatable element such that the second moveable element opens a brine tank valve (as illustrated in FIG. 7 showing the valve assembly when the first rotatable element is in a brine flow position) allowing the brine tank to fill up with water which then dissolves sodium salt stored in the brine tank to create a brine solution.

In some examples, the instructions cause the system to activate the gear motor and rotate the element in a clockwise direction back to position A while the brine solution is being created. In various examples, the water remains in the brine tank for approximately two hours to sufficiently dissolve a sufficient amount of the salt, but any time interval appropriate for the creation of brine may be used depending on the characteristics of the system. The instructions may then cause the system to activate the gear motor and rotate the first rotatable element in a clockwise direction to a subsequent position C, where the operable connection to the first moveable element causes it to move to a position allowing any water in the resin tank to drain out.

The instructions may then cause the system to activate the gear motor and rotate the first rotatable element in a clockwise direction to a subsequent position D, where the operable connection to the first moveable element and, ultimately, the second moveable element via the second rotatable element, causes them to move to positions allowing the created brine solution to flow into and through the resin of the resin tank, and then out through a drain (i.e. a "brine draw/slow rinse" rotational position of the possible "brine flow" rotational positions) to flush the hard ions and excess brine from the resin in the tank. The instructions may then, after a sufficient amount of time has passed to regenerate the resin, cause the system to activate the gear motor and rotate the first rotatable element in a clockwise direction to a subsequent position E to rinse the now regenerated resin to remove any remaining brine/hard ion solution and help settle the resin bed. The instructions may then cause the first rotatable element to return to home/service position A. In some embodiments, the direction of rotation may always be in one direction (e.g. clockwise), or may vary as appropriate to minimize the distance travelled between desired positions. In various examples of water filtering systems, the system is configured to move between positions providing a "backwash" flow, i.e. a reverse flow through a water filter to remove any debris and/or sediment, a "fast rinse" flow to rinse the filter, and a "service" flow for general use.

By being able to measure the electrical resistance whenever desired, the system may be able to determine the rotational position of the first rotatable element, and thus may directly rotate the element to a different position without any/minimal recalibration, or without searching for one or more particular reference points. In other words, the systems allow changes in valve flow without the need for recalibration or unnecessary and excessive motion of the components of the system, even if there is a memory loss event. This disclosure contemplates that various embodiments that the system may be capable of immediately determining if the first rotatable element is in an initial position or any particular subsequent position, without, for example, recalibration. Relatedly, this disclosure contemplates that in various embodiments the rotary position sensor may be configured to detect the rotational position of the first rotatable element, whether in the initial rotational position or one of the subsequent rotation positions, during use of the system without recalibrating to a reference position.

This disclosure also contemplates that in some examples the system may be capable of rotating the first rotatable element from one position directly to any other desired rotational position, whether, for example, directly back to the initial position (for example, position A of FIG. 4) or a subsequent rotational position (for example, position E of FIG. 4). Relatedly, this disclosure contemplates that various embodiments of the system may be configured to rotate the first rotatable element from one desired position (e.g. an initial or subsequent rotational position allowing a particular flow of a valve assembly) to another desired position without any rotational motion beyond the rotation to traverse the number of degree(s) formed by the angle between the two positions. This disclosure further contemplates that various embodiments of the system may be capable of directly rotating the first rotatable element in any direction as appropriate to minimize the distance traveled between rotational positions (for example, counterclockwise between positions A and B of FIG. 4, and then clockwise between positions C and D of FIG. 4).

Figure 8:
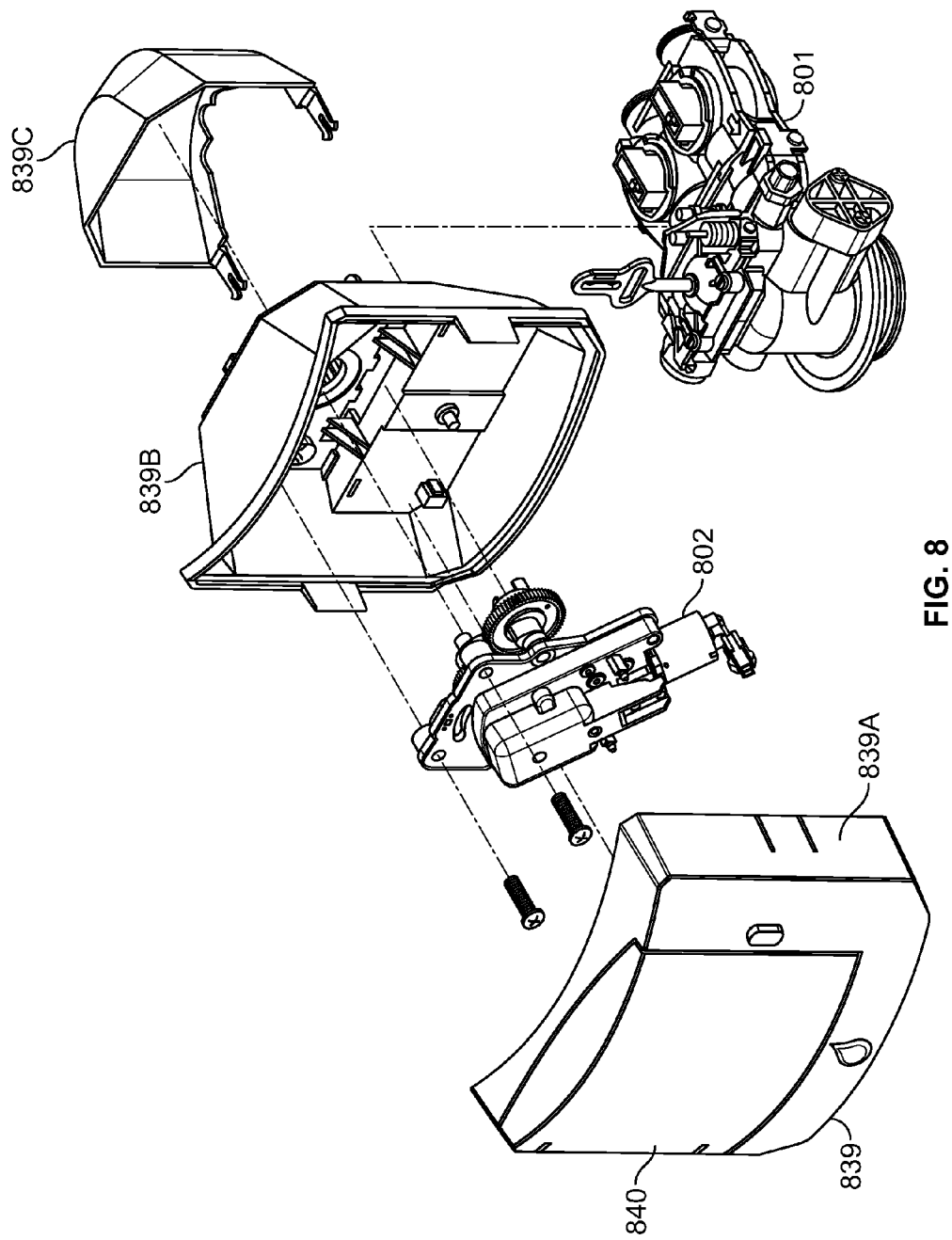
FIG. 8 illustrates an exploded perspective view of components of an exemplary embodiment of a water softening system.
Figure 9:
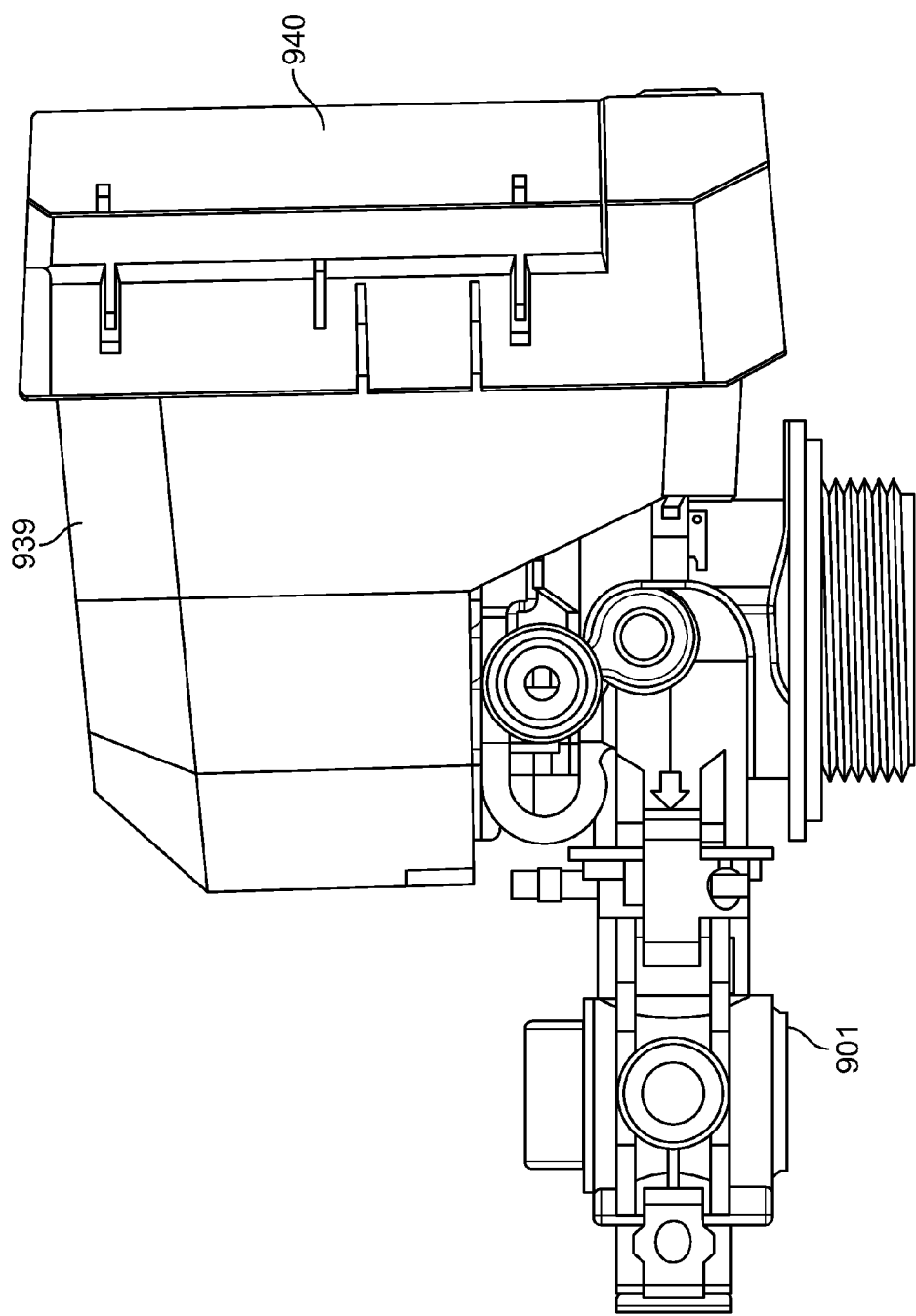
FIG. 9 illustrates side view of an assembled exemplary embodiment of a valve control system for use in a water softening system.

In some examples, the system comprises rotary position sensor housing, such as the housing 107 shown in FIG. 1. The housing may consist of or comprise any suitable material, for example a thermoplastic or metal material. In some embodiments, the housing is a injection molded plastic. In various examples, the system further comprises a wiper disc, such as the disc 108 in FIG. 1. The disc may be any suitable material that assists in preventing grease of other materials from the gear motor from reaching the sensor area. In some examples, the system comprises one or more bushings for a shaft of one of the rotatable elements, for example the shaft bushing 109 of FIG. 1, to assist the rotation of the rotatable elements. In some examples, the system further comprises an exterior housing, such as the exterior housing shown in FIGS. 8 and 9. In some examples, the exterior housing comprises multiple sections, for example in the embodiment of FIG. 8, the exterior housing comprises a front housing 839A, a rear hosing 839B and a rear cover 839C. In certain examples, the housing or front section of the housing comprises a door, such as door 840. The door may be configured to be selectively opened by a user to access a control interface for the water softening system. The embodiment of FIG. 9 shows an assembled view of the exterior housing around the valve assembly 901 and the valve control system 902 (not visible).

As mentioned above, FIGS. 6 and 7 show exemplary embodiments of the water softening systems. The embodiment of FIG. 6 illustrates a valve assembly 601 where a first moveable element 613 is positioned in an initial position allowing service flow of water. The embodiment further comprises a rotatable cam 610 of a first rotatable element 603 operably connected to the first moveable element, and a second rotatable element 604 having projections 622 operably connected to a second movable element. The embodiment further comprises a plurality of channels 634 within the valve assembly, which may be connected to a plurality of ports and/or other end points, such as the brine tank port 617, which is connected to a brine tank 636 containing a sodium salt 637. This exemplary embodiment further comprises a resin channel 638 allowing the flow of water to and/or from a resin tank 635. As discussed above, as the first rotatable element 603 rotates from one position to another, the first and second moveable elements may move to corresponding positions via the operable connections. Based on the position of these elements, a particular flow path inside the valve assembly may be opened or blocked as needed based on the desired functionality. FIG. 7 shows a similar exemplary embodiment with analogous components, where in this exemplary embodiment the first rotatable element 703 is in a brine flow position and the second moveable element 704 is positioned such that the brine valve is open.

These descriptions of the water treatment system are merely exemplary. In certain embodiments, the water treatment and/or water softener systems comprise additional combinations or substitutions of some or all of the features and/or components described above. Moreover, additional and alternative suitable variations, forms, features and components will be recognized by those skilled in the art given the benefit of this disclosure. In additional, any of the steps described above, or below in connection with the valve control system or method examples, may be performed by the water treatment system, and vice versa.

Other exemplary aspects relate to valve control systems. Any of the features discussed in the exemplary embodiments of the water treatment systems may be features of embodiments of the valve control systems, and vice versa. Moreover, any of the steps described above or below in connection with the method examples may be performed by the valve control systems, and vice versa.

In some examples, the valve control system includes a first rotatable element configured to be operably connected to a first moveable element of a valve assembly, and configured to move from an initial rotational position to at least one subsequent rotational position. In certain embodiments, the valve control system further comprises a rotary position sensor operably connected to the first rotatable element and configured to detect the rotational position of the first rotatable element. In various examples, the rotary position sensor comprises a resistive material having an electrical resistance when an electric current is applied and having a first end and a second end. In certain examples, the first rotatable element comprises a contact wiper, or is integrally or operably connected to a contact wiper, and the contact wiper is configured to rotate with the first rotatable element. In at least some of its rotational positions, the contact wiper may contact the resistive material between the first end and the second end. In various examples of the valve control system, the rotary position sensor is configured to apply an electric current to the resistive material and measure the electrical resistance of a portion of the resistive material between an end of the resistive material and the contact wiper to detect the rotational position of the first rotatable element.

In some examples, the valve control system further includes a motor configured to rotate the first rotatable element. In certain examples it includes at least one computer processor and at least one non-transitory computer-readable medium having stored therein computer executable instructions. In certain examples, when the instructions are executed by the at least one processor, they cause the valve control system to rotate the first rotatable element from its initial rotational position to at least one subsequent rotational position, at least two subsequent rotational positions, or at least four subsequent rotational positions, where the rotary position sensor determines when the first rotatable element is in a particular subsequent rotational position.

In some examples, the instructions further cause the valve control system to rotate the first rotatable element from its initial rotational position to at least two subsequent rotational positions, wherein the rotary position sensor determines when the first rotatable element is in each of the at least two subsequent rotational positions, and where the valve control system is configured to rotate the first rotatable element directly from one subsequent rotational position to another subsequent rotational position.

In various embodiments, the system include a second rotatable element operably connected to the first rotatable element and configured to be operably connected to a second moveable element of a valve assembly. In certain examples the instructions further cause the valve control system to rotate the second rotatable element, via the first rotatable element, from an initial rotational position to at least one subsequent rotational position In various embodiments, a range of measured electrical resistance values is used to detect whether the first rotatable element is in an initial rotational position or at least one subsequent rotational position. In certain examples, the contact wiper and the resistive material are configured such that the contact wiper is not in contact with the resistive material in at least some of its rotational positions.

These descriptions of the valve control system are merely exemplary. In certain embodiments, the valve control system comprises additional combinations or substitutions of some or all of the components and/or features described above. Moreover, additional and alternative suitable variations, forms, features and components for the valve control system, and steps capable of being performed by the valve control system, will be recognized by those skilled in the art given the benefit of this disclosure.

Other exemplary aspects relate to apparatuses. Any of the features discussed in the exemplary embodiments of the water treatment systems and/or valve control systems may be features of embodiments of the apparatus, and vice versa. Moreover, any of the steps described above or below in connection with the method examples may be performed by the apparatus examples, and vice versa.

Other exemplary aspects relate to methods, including methods of softening water and/or controlling flow through a valve assembly, for example a valve assembly of a water softening system or a water treatment system. In certain embodiments, the methods utilize any of the components and/or features described above in reference to embodiments of the water softening systems and/or valve control systems. Moreover, additional and alternative suitable variations, forms, features and components for use in the method will be recognized by those skilled in the art given the benefit of this disclosure.

In some examples, the method comprises rotating a first rotatable element operably connected to a first moveable element of a valve assembly from an initial rotational position to at least four subsequent rotational positions to move the first moveable element from an initial position, corresponding to the initial rotational position of the first rotatable element, to at least four subsequent positions corresponding to the at least four subsequent rotational positions of the first rotatable element. In certain embodiments the method includes detecting the rotational position of the first rotatable element through a rotary position sensor operably connected to the first rotatable element. In some examples, first rotatable element rotates directly from one subsequent rotational position to another subsequent rotational position.

In various embodiments a motor rotates the first rotatable element. In some examples at least one computer processor executes computer executable instructions stored on at least one non-transitory computer-readable medium to cause the motor to rotate the first rotatable element from the initial rotational position to one of the subsequent rotational positions. In certain embodiments they further cause the rotary position sensor to determine when the first rotatable element is in one of the subsequent rotational positions.

In certain examples, the rotary position sensor comprises a resistive material having an electrical resistance when an electric current is applied, the resistive material comprises a first end and a second end, the first rotatable element comprises a contact wiper, or is integrally or operably connected to a contact wiper, and the contact wiper is configured to rotate with the first rotatable element and, in at least some of its rotational positions, contact the resistive material between the first end and the second end. In various examples, the method further comprises applying an electric current to the resistive material and measuring the electrical resistance of a portion of the resistive material between an end of the resistive material and the contact wiper to detect the rotational position of the first rotatable element.

In some embodiments of the method, a second rotatable element is operably connected to the first rotatable element, a second moveable element of the valve assembly is operably connected to the second rotatable element, and the second moveable element is configured to open or close a brine tank valve of the valve assembly. In some examples, the method further comprises rotating the first rotatable element from the initial rotational position to at least one brine flow rotational position, wherein brine tank valve is open when the first rotatable element is in the at least one brine flow position. In various embodiments, a range of measured electrical resistance values is used to detect whether the first rotatable element is the initial rotational position or the at least four subsequent rotational positions. In some examples, the contact wiper and the resistive material are configured such that the contact wiper is not in contact with the resistive material in at least in at least some of its rotational positions.

These method descriptions are merely exemplary. In certain embodiments, the method comprises additional combinations or substitutions of some or all of the steps described in this disclosure. Moreover, additional and alternative steps will be recognized by those skilled in the art given the benefit of this disclosure.

What is claimed is:

1. A water treatment system comprising:
   a first rotatable element operably connected to a first moveable element of a valve assembly and configured to move from an initial rotational position to at least two subsequent rotational positions, and further configured to move the first moveable element between an initial position corresponding to the initial rotational position of the rotatable element, and at least two subsequent positions corresponding to the at least two subsequent rotational positions of the first rotatable element; and
   a rotary position sensor operably connected to the first rotatable element and configured to detect the rotational position of the first rotatable element during use of the system without recalibrating to a reference position, wherein the rotary position sensor comprises a resistive material having an electrical resistance when an electric current is applied, and the resistive material comprises a first end and a second end;
   wherein the valve assembly is configured to be independently connected to at least two of: a brine tank, a resin tank, a water supply, a drain, and a plumbing system;
   wherein the water treatment system is configured to move the first rotatable element directly from one subsequent rotational position to another subsequent rotational position;
   wherein the first rotatable element comprises a contact wiper, or is integrally or operably connected to a contact wiper;
   wherein the contact wiper is configured to rotate with the first rotatable element and, in at least some of its rotational positions, contact the resistive material between the first end and the second end;
   wherein the rotary position sensor is configured to apply an electric current to the resistive material and measure the electrical resistance of a portion of the resistive material between an end of the resistive material and the contact wiper to detect the rotational position of the first rotatable element; and
   wherein a range of measured electrical resistance values is used to detect whether the first rotatable element is the initial rotational position or the at least two subsequent rotational positions, and wherein the moving of the first rotatable element directly from one subsequent rotational position to another subsequent rotational position is accomplished without rotating the first rotatable element a full revolution or more.

2. The water treatment system of claim 1, further comprising:
   a motor configured to rotate the first rotatable element;
   at least one computer processor; and
   at least one non-transitory computer-readable medium having stored therein computer executable instructions, that when executed by the at least one processor, cause the water treatment system to:
      rotate the first rotatable element from the initial rotational position to one of the subsequent rotational positions, wherein the rotary position sensor determines when the first rotatable element is in one of the subsequent rotational positions.

3. The water treatment system of claim 2, further comprising:
   a second rotatable element operably connected to the first rotatable element; and
   a second moveable element of the valve assembly operably connected to the second rotatable element, wherein the second moveable element is configured to open or close a brine tank valve of the valve assembly;
   wherein the computer executable instructions, when executed by the at least one processor, further cause the water treatment system to:
      rotate the first rotatable element from the initial rotational position to at least one brine flow rotational position, wherein brine tank valve is open when the first rotatable element is in the at least one brine flow position.

4. The water treatment system of claim 2, wherein the computer executable instructions, when executed by the at least one processor, further cause the water treatment system to:
   rotate the first rotatable element from the initial rotational position to at least four subsequent rotational positions, wherein the rotary position sensor determines when the first rotatable element is in each of the at least four subsequent rotational positions;
   wherein the first moveable element of the valve assembly is configured to move to at least four subsequent positions corresponding at least four subsequent rotational positions of the first rotatable element.

5. The water treatment system of claim 1, wherein the contact wiper and the resistive material are configured such that the contact wiper is not in contact with the resistive material in at least some of its rotational positions.

6. A valve control system comprising:
   a first rotatable element configured to be operably connected to a first moveable element of a valve assembly and configured to move from an initial rotational position to at least one subsequent rotational position; and
   a rotary position sensor operably connected to the first rotatable element and configured to detect the rotational position of the first rotatable element, wherein the rotary position sensor comprises a resistive material having an electrical resistance when an electric current is applied and comprising a first end and a second end;
   wherein the first rotatable element comprises a contact wiper, or is integrally or operably connected to a contact wiper, the contact wiper being configured to rotate with the first rotatable element and, in at least some of its rotational positions, contact the resistive material between the first end and the second end;

and wherein the rotary position sensor is configured to apply an electric current to the resistive material and measure the electrical resistance of a portion of the resistive material between an end of the resistive material and the contact wiper to detect the rotational position of the first rotatable element, and wherein a range of measured electrical resistance values is used to detect whether the first rotatable element is the initial rotational position or the at least one subsequent rotational positions, and wherein the moving of the first rotatable element from one rotational position to another rotational position is accomplished without rotating the first rotatable element a full revolution or more.

7. The valve control system of claim 6, further comprising:
a motor configured to rotate the first rotatable element;
at least one computer processor; and
at least one non-transitory computer-readable medium having stored therein computer executable instructions, that when executed by the at least one processor, cause the valve control system to:
rotate the first rotatable element from the initial rotational position to the at least one subsequent rotational position, wherein the rotary position sensor determines when the first rotatable element is in the at least one subsequent rotational position.

8. The valve control system of claim 7, wherein the computer executable instructions, when executed by the at least one processor, further cause the valve control system to:
rotate the first rotatable element from the initial rotational position to at least two subsequent rotational positions, wherein the rotary position sensor determines when the first rotatable element is in each of the at least two subsequent rotational positions;
wherein the valve control system is configured to rotate the first rotatable element directly from one subsequent rotational position to another subsequent rotational position.

9. The valve control system of claim 7, further comprising:
a second rotatable element operably connected to the first rotatable element and configured to be operably connected to a second moveable element of a valve assembly; and
wherein the computer executable instructions, when executed by the at least one processor, further cause the valve control system to:
rotate the second rotatable element, via the first rotatable element, from an initial rotational position to at least one subsequent rotational position.

10. The valve control system of claim 8, wherein the computer executable instructions, when executed by the at least one processor, further cause the valve control system to:
rotate the first rotatable element from the initial rotational position to at least four subsequent rotational positions, wherein the rotary position sensor determines when the first rotatable element is in each of the at least four subsequent rotational positions.

11. The valve control system of claim 6, wherein a range of measured electrical resistance values is used to detect whether the first rotatable element is in the initial rotational position or the at least one subsequent rotational position.

12. The valve control system of claim 6, wherein the contact wiper and the resistive material are configured such that the contact wiper is not in contact with the resistive material in at least some of its rotational positions.

13. The valve control system of claim 6, wherein the rotary position sensor is configured to detect the rotational position of the first rotatable element during use of the system without recalibrating to a reference position.

14. A method comprising:
rotating a first rotatable element operably connected to a first moveable element of a valve assembly from an initial rotational position to at least four subsequent rotational positions to move the first moveable element from an initial position, corresponding to the initial rotational position of the first rotatable element, to at least four subsequent positions corresponding to the at least four subsequent rotational positions of the first rotatable element; and
detecting the rotational position of the first rotatable element through a rotary position sensor operably connected to the first rotatable element;
wherein the first rotatable element is rotated directly from one subsequent rotational position to another subsequent rotational position,
wherein the rotary position sensor comprises a resistive material having an electrical resistance when an electric current is applied, and wherein the resistive material comprises a first end and a second end;
wherein the first rotatable element comprises a contact wiper, or is integrally or operably connected to a contact wiper;
wherein the contact wiper is configured to rotate with the first rotatable element and, in at least some of its rotational positions, contact the resistive material between the first end and the second end, and
the method further comprising applying an electric current to the resistive material and measuring the electrical resistance of a portion of the resistive material between an end of the resistive material and the contact wiper to detect the rotational position of the first rotatable element, wherein a range of measured electrical resistance values is used to detect whether the first rotatable element is the initial rotational position or the at least four subsequent rotational positions, and wherein the rotating of the first rotatable element directly from one subsequent rotational position to another subsequent rotational position is accomplished without rotating the first rotatable element a full revolution or more.

15. The method of claim 14, wherein a motor rotates the first rotatable element, and wherein at least one computer processor executes computer executable instructions stored on at least one non-transitory computer-readable medium to cause the motor to rotate the first rotatable element from the initial rotational position to one of the subsequent rotational positions, and to further cause the rotary position sensor to determine when the first rotatable element is in one of the subsequent rotational positions.

16. The method of claim 14, wherein:
a second rotatable element is operably connected to the first rotatable element;
a second moveable element of the valve assembly is operably connected to the second rotatable element;
the second moveable element is configured to open or close a brine tank valve of the valve assembly; and the method further comprises rotating the first rotatable element from the initial rotational position to at least one brine flow rotational position, wherein the brine tank valve is open when the first rotatable element is in the at least one brine flow position.

17. The method of claim 14, wherein the rotary position sensor is configured to detect the rotational position of the first rotatable element during use of the system without recalibrating to a reference position.

18. The method of claim 13, wherein the contact wiper and the resistive material are configured such that the contact wiper is not in contact with the resistive material in at least in at least some of its rotational positions.

* * * * *